United States Patent
Feigel et al.

(10) Patent No.: US 7,377,375 B2
(45) Date of Patent: May 27, 2008

(54) CONTINUOUS MOTION PRODUCT TRANSFER SYSTEM WITH CONVEYORS

(75) Inventors: Harold Feigel, Short Hills, NJ (US); Joseph Cardinali, Clinton, NJ (US); Douglas Feigel, Mountainside, NJ (US)

(73) Assignee: Cardinal Machine Corp., USA, Mountainside, NJ (US)

( * ) Notice: Subject to any disclaimer, the term of this patent is extended or adjusted under 35 U.S.C. 154(b) by 143 days.

(21) Appl. No.: 11/367,851

(22) Filed: Mar. 3, 2006

(65) Prior Publication Data
US 2006/0201780 A1    Sep. 14, 2006

Related U.S. Application Data

(60) Provisional application No. 60/658,715, filed on Mar. 4, 2005.

(51) Int. Cl.
*B65G 17/32* (2006.01)

(52) U.S. Cl. ............................. 198/377.06; 198/457.03; 198/597

(58) Field of Classification Search ................ 198/597, 198/598, 463.2, 456, 457.01, 457.03, 377.1, 198/377.06, 477.1, 474.1, 803.14
See application file for complete search history.

(56) References Cited

U.S. PATENT DOCUMENTS

| | | | | |
|---|---|---|---|---|
| 2,640,607 A | * | 6/1953 | De Burgh | 198/377.06 |
| 3,166,181 A | * | 1/1965 | Rutkus et al. | 198/457.01 |
| 3,215,250 A | * | 11/1965 | Schubert | 198/377.04 |
| 5,090,553 A | * | 2/1992 | Focke | 198/377.06 |
| 5,992,609 A | * | 11/1999 | Maier | 198/598 |
| 6,962,250 B2 | * | 11/2005 | Van Liempd et al. | 198/457.03 |

* cited by examiner

*Primary Examiner*—James R. Bidwell
(74) *Attorney, Agent, or Firm*—Lerner, David, Littenberg, Krumholz & Mentlik, LLP (57) ABSTRACT

A product transfer system preferably includes a first conveyor for conveying a series of product in a first direction. This system also includes a cross conveyor vertically spaced from the first conveyor and oriented in a second direction angled at an angle $\alpha$ with respect to the first direction. A plurality of rotatable transporters are mounted on the cross conveyor for transferring the product from the first conveyor to the cross conveyor. The transporters are initially oriented perpendicular to the first direction before receiving the products and are rotatable to the second direction after receiving the products.

29 Claims, 7 Drawing Sheets

CONTINUOUS MOTION PRODUCT TRANSFER SYSTEM WITH CONVEYORS

This application claims the benefit of U.S. Provisional Application No. 60/658,715 filed on Mar. 4, 2005, the disclosure of which is incorporated by reference herein.

BACKGROUND OF THE INVENTION

The present invention relates to product transferring systems and more specifically to transferring a discrete number of baked goods such as crackers from a first conveyor to a second conveyor or cross conveyor that is traveling in a generally different direction wherein both the product and the mechanism that conveys the product are in continuous motion.

With today's modern high-speed packaging technology, many products require the rearranging or reorientation of the product as it is being conveyed. This can be due to an automated dispensing machine that initially positions a product with one orientation while a subsequent operation requires that the product be received with a different orientation. This is especially troublesome for the food industry and most specifically for mechanical handlers of cookies, crackers, baked goods and the like that will be automatically wrapped while on edge to create packages.

After crackers exit an oven, they are eventually organized into horizontally oriented groups on edge in which each group has a finite number of crackers. To begin orienting the groups for packaging, the groups, known in the art as slugs, are usually then dispensed onto a first conveyor traveling in a first direction. Because of the requirements of the automated dispensing machine, the groups or slugs are oriented with their longest length being perpendicular to the direction of movement of the first conveyor. Thus, after dispensing, the cookie or cracker edges are oriented in the first direction of travel on the first conveyor.

After entry on or into the first conveyor, the groups or slugs proceed through the first conveyor to the remainder of the conveyor system towards a wrapping machine. Due to the requirements of the wrapping machine, the direction of orientation of the groups must be changed by 90 degrees to allow the slugs to enter the packaging machine lengthwise. This requires the direction of travel of the slugs to be changed from the first orientation where their lengthwise direction is perpendicular to the movement of a conveyor to a second orientation where their lengthwise direction is parallel to the direction of movement on the conveyor. In the second direction, the faces of the crackers are oriented in the direction of travel.

In order to achieve the desired result of reorienting the groups by 90 degrees, prior art designs align two conveyors orthogonal to one another. The first conveyor receives the slugs of crackers with their lengths extending perpendicular to the direction of movement of the conveyor. The first conveyor transports the slugs from a slug forming/dispensing machine or mechanism at the beginning of the first conveyor to a second conveyor positioned at the end of travel of the first conveyor. The second conveyor, called a cross conveyor, is continuously moving in a direction that is 90 degrees to the movement of the first conveyor. Various techniques and features are used in the prior art to transfer the slugs from the first conveyor to the cross conveyor. In one of its simplest forms, the transfer technique involves a reciprocating mechanism that slides each slug in turn from the first conveyor to the second conveyor which results in changing the direction of the slugs. Problems with existing systems at higher speeds include damage to the crackers caused by an abrupt change in direction of travel and the physical limitations of the reciprocating mechanism that transfers the slugs from the first conveyor to the second conveyor due to the inertial forces involved.

Thus, the slug on the first conveyor may be visualized as moving at a speed S along an X-direction and a speed 0 in the Y-direction. Upon reaching the cross conveyor, the slugs change velocity so as to move at a speed of 0 in the X-direction and at a speed of T in the Y-direction. Practically, this results in the slug remaining still for a certain moment of time as they are transferred between the two conveyors. The rate at which crackers may be moved from a dispensing automated machine to an automated wrapping machine is limited by the brief stopping of the crackers as they change direction.

Those familiar with the art of transporting cookies and crackers on edge know that the product must be constrained or confined in a predictable and orderly way during the transporting from an oven where the product lays flat and to the final wrapping where the product is on edge. In the current method of moving product through the first conveyor, the first conveyor has moving flight bars along both long sides of the slugs. The flight bars confine and transport the slugs and keep the slugs separated from each other at a predetermined pitch or distance. Usually, fixed guides in current first conveyors keep the crackers in line and from falling over at either short end of the slugs. The first conveyor is usually fed or supplied with slugs by upstream dispensing machinery or, occasionally, by hand.

Currently, cross conveyors, also called in-feed conveyors or in-feed sections because the in-feed is an integral part of the machine that does the wrapping downstream, use moving pins at both short ends of the slugs to transport the slugs and to keep the end of each slug upright. The moving pins at the front and rear ends of each slug also set the pitch or distance between slugs. Fixed side guides or guide rails along both long edges of the slug keep the crackers in line along the sides of the slug as the slugs are transported by the pins. During normal operation, the pins of the cross conveyor move the slugs at a constant speed so as to accommodate the operations downstream. However, since the downstream wrapping operation is not flawless and for this reason and for other reasons that are not germane, automatic electronic means are usually provided to sometimes slow down or stop the wrapping operation and correspondingly slow or stop the cross and first conveyors as well as the product being fed to the first conveyor.

There is an opening in one of the side rails of the cross conveyor of current equipment where the first conveyor abuts the cross conveyor. The opening in the side rail of the cross conveyor is where reciprocating machine mechanisms transfer a slug from the first conveyor to the space between the moving pin arrangement of the cross conveyor. The reciprocating transfer mechanism pushes the slug, on the long side, in between the moving pins of the cross conveyor where the second of the two pins then pushes the slug on a short side in a perpendicular direction to the direction in which the slug had been moving before transfer. The timing of the transfer from the first conveyor to the cross conveyor is critical since the slug must be pushed into position between two pins at the same moment that the moving pins are passing the location where the slug will be received. The distance between pins is only slightly more than the length of the incoming slug. As a consequence of the right angle change in direction of travel of the slug, the slug's movement is stopped for a brief moment. The brief stop or intermittent motion of the slug and, of course, the intermittent motion of the mechanism that transfers the slug from a transverse moving direction to an in-line moving direction, establishes a practical, maximum transfer speed. Intermittent motion can be imagined by envisioning a non-stop train moving through a passenger station with a door open and a passenger on the platform running across the platform toward the moving train at a right angle and jumping through the open door in order to board the moving train. The time interval for transfer and change of direction is short and must be precise for both the slug in existing machines and the passenger in the train analogy.

Some increase in speed is accrued in current machines by including a mechanism in the cross conveyor to withdraw the first moving pin that would be in front of the slug before the moment of slug transfer from the first conveyor to the cross conveyor and then immediately restoring the front pin as soon as the slug transfer is complete. In the industry, the hardware devices that are in front of and in back of each slug in the cross conveyor are commonly called pins, although, they are in practice, all manner of configurations including custom shape castings.

The narrow window of time available for transfer of slugs associated with the abrupt change in direction of motion of the slug and possibly the normal variation in the size of slugs, results in a high rate of product breakage in existing machinery.

SUMMARY OF THE INVENTION

The present invention relates to a high speed method for changing the orientation of groups of product. The groups are initially moving with the longitudinal axis of each group in parallel with the longitudinal axis of other similarly moving groups and at a fixed distance between each group. Each group may be composed of a single entity or be composed of individual members. The method for changing the orientation of product is achieved with continuous motion of both the mechanism that executes the change and the product thereby enabling the change to be made at a higher speed than can be achieved by current state of the art methods discussed above.

The present invention is applicable to any group of ordered product of any shape that may or may not be similar to the groups of crackers called slugs referred to in the explanation of the prior art. However, the following explanation of the present invention will use, where convenient, the phraseology associated with crackers and slugs and existing related machinery so that the new concepts will require a less tedious explanation. Accordingly, the illustrative embodiment of the invention is shown for crackers, cookies and the like. In reality the present invention is applicable to a myriad of related and unrelated products including, but not limited to, all manner of shape, size and integrity such as solids or compositions of discrete items such as, for example, boxes.

The present invention incorporates a first transporter or first conveyor for handling incoming slugs. The parallel long axes of the slugs are transverse to the direction of movement of the first conveyor, as the slugs move along the first conveyor. In effect the first conveyor is moving slugs that are oriented side by side with a space between slugs. The first conveyor uses an inverted U-shaped flight bar along one long side of each slug to push or convey the slug by sliding the slug on a dead plate table and another U-shaped flight bar along the other long side of each slug to contain the product. The space between each pair of the parallel flights is open and unobstructed at one end while at the other end the traveling flights are mechanically driven and supported in a cantilever arrangement. The opening at one end and between each pair of flights allows a slug to be moved or pushed out from between the flights. The flights move the slug transversely. When appropriate, the slug is pushed out from between the parallel flights by another mechanism.

In the first conveyor, a fixed rail guide is used to contain and hold the crackers upright on the short side of the slug. The rail guide is positioned at the open end of the flights during the part of the slug's travel where the slug will not be pushed out from between the parallel flights. The other short side of the slug, that does not face the open side of the pair of flights, is contained by a tab that is preferably integral to one of the U-shaped flights. The tab could, alternatively, be integral to the opposing flight or there could be tabs on both flights if required to contain various shaped products. The flights and tab combination of the first conveyor are preferably on three sides of the slug and are preferably configured so that they contact only a lower portion of the slug as they transport and restrain the slug during transport.

The fixed rail guide that restrains the fourth side of the slug at the open end of the flights is preferably positioned to restrain the slug by contacting the upper half of the slug. With the moving flights acting on a portion of the lower half of the slug and the fixed rail guide acting on the upper half of the slug, it is possible for the flights to travel below the fixed rail without interference. This is particularly important in the event the fixed rail and the moving flights must overlap in order to sufficiently restrain the slug of a particular product. If the product being transported is of such a nature that it needs less precise restraint at the open ends of the flights, then the fixed rail guide can be adjacent to the ends of the passing flights and can restrain the slug either above or below the center line of the slug or both, without concern about interference.

The present invention includes, in addition to the aforementioned first conveyor, a suitably configured cross conveyor wherein both conveyors share a common dead plate table. The slugs in the first conveyor travel side by side with a space between the slugs. The purpose of the cross conveyor in combination with the first conveyor, is to continuously move and receive the slugs and then to reorient the slugs so that the slugs are traveling end-to-end with a predetermined space between them.

During operation of the present invention, each slug in turn is received from the first conveyor in a rotatable transporter of the cross conveyor thence reoriented by the rotatable transporter so that the slug is traveling end-to-end at a predetermined distance with the immediate previous slug. An applicable moving member of the cross conveyor gradually receives a slug while the slug also continues to be contained and transported, by sliding, across the common dead plate between a pair of flights of the first conveyor. As both conveyors continue to move in unison, the transporter for the slug of the cross conveyor gradually slides the slug out from between the flights of the first conveyor at the open end of the parallel flights until the applicable transporter member of the cross conveyor becomes the sole container and transporter of each slug. Subsequently, while still transporting the slug, the applicable member of the cross conveyor gradually rotates and thereby positions the moving slug into an in-line or end-to-end arrangement with the preceding slug. The slug is then discharged in a coordinated manner onto the in-feed section of a wrapping machine.

Although the described embodiment of the present invention uses crackers or slugs as the product for illustrating the mode of operation, alternative products could include a contained material, whether solid or not, or groups of individual members that could be arranged into uniform slugs, or a combination group composed of a solid and individual members as well as many other products.

The angle of travel between the first conveyor and the cross conveyor is at an angle that is not a right angle as distinguished from the prior art. The angle is predetermined with simple vector analysis based on the pitch between slugs disposed on the first conveyor and the in line pitch that is required between slugs at the output of the cross conveyor. In a broader perspective, the fixed distance between parallel slugs as the slugs enter the mechanism of the present invention and the required in line distance between slugs exiting the mechanism of the invention dictate the angle between the first conveyor and the cross conveyor. The word pitch applies to the distance between corresponding points or locations of adjacent members while the word distance by itself can refer, depending on engineering context, either to the shortest distance between members or the aforementioned pitch. Use of simple equations or vector graphics determines the angle between the line of action of the first conveyor and the line of action of the cross conveyor as a function of the pitch of the parallel slugs in the first conveyor and the pitch of the in line slugs in the cross conveyor.

As a consequence of the vector relationship between the two conveyors, one of the two right angle vector components of the cross conveyor in velocity magnitude (speed) and direction, is intentionally made equal to the vector of the first conveyor in velocity magnitude (speed) and direction. Accordingly, a slug that is transferred to the cross conveyor continues to move with the same velocity in the direction of the first conveyor. As the transferred slug in the cross conveyor is moving with the same velocity in the direction of the first conveyor, the slug is also moving laterally away from the first conveyor. Restated, this means that a slug that is being transferred from the first conveyor to the cross conveyor will see no change in velocity in the direction of the first conveyor while simultaneously moving away from the first conveyor in a direction that includes a vector parallel and a vector perpendicular to the direction of travel of the first conveyor.

The cross conveyor preferably includes a transporter. The transporter may be configured with a two-tine U-shaped fork. When engaging a slug, the transporter preferably only contacts the upper half of the slug. The fork is preferably supported from above by a transporter that continuously transports the fork in the linear direction of travel or path of the cross conveyor. At specific locations in the linear travel path of the fork in the direction of the cross conveyor, the transporter rotates the fork to change the direction in which the open tines of the fork face. The transporter also keeps the tines of the fork parallel to the dead plate table on which the slugs travel as well as keeping the fork at an elevation above the dead plate that is just above the middle of the slug.

As the transporter moves the fork in the linear direction of travel of the cross conveyor, the mechanism generally positions the open tines of the fork in what is called the in-line rotation position where the opening between the two tines is leading the travel of the fork. Accordingly, in the in-line rotation position of the fork, the two tines of the fork are parallel to the linear direction of travel of the cross conveyor. In the preferred embodiment of the invention, a spring and stop combination of the transporter holds the fork in the in-line rotational position so that the fork is in line with the direction of the travel of the cross conveyor. Among the other alternatives to the spring and stop combination for holding the fork in line with the cross conveyor would be a detent configuration or the like.

During operation of the present invention, the path of action of the cross conveyor intersects the path of action of the first conveyor in such a way that the moving forks of the cross conveyor pass over the moving flights of the first conveyor, without interference. Before the fork reaches the slug in the first conveyor in the area or zone of intersection of the two conveyors, a fixed linear cam that is integral to the cross conveyor gradually rotates the fork of the transporter mechanism from the in-line rotation position to what is called the full rotation position so that the tines of the fork are parallel to the sides of the slug. After fork rotation by the cam to the full rotation position in the preferred embodiment, the cam shape sustains the fork rotation for a required interval. Although the cam is used to continue to hold the fork in the full rotation position for a required interval, a detent configuration would also be suitable as a holding device. The motion of the cross conveyor is synchronized with the motion of the first conveyor so that in the full rotation position, the tines of the fork are symmetric to, and of course, parallel with the slug in the first conveyor. The symmetric alignment of the fork in the cross conveyor with the slug in the first conveyor is the result of another aspect of the present invention whereby an electro/mechanical structure synchronizes the traveling location of the slug in the first conveyor with the traveling location of the fork in the cross conveyor. Although an electro/mechanical structure is the preferred method for synchronizing the two conveyors in the present invention, a direct mechanical structure could also be used.

With continuing motion of both the first conveyor transporting a slug and the cross conveyor with the fork, the fork gradually engages the slug. After further synchronized motion of both conveyors, the aligned fork fully engages part of the upper half of the slug on three sides while a part of the lower half of the slug is simultaneously, still fully engaged by the flights of the first conveyor. Additional continuing motion of both conveyors brings the open end of the flights with the slug, clear of the fixed guide rail. The fork gradually pushes the slug out from between and finally away from the moving flights of the first conveyor. After the fork pushes the slug out from between and away from the moving flights of the first conveyor, the fork then independently restrains the slug on three sides while continuing the slugs motion both parallel to the now disengaged flights and at the same time perpendicular or transverse to the path of the now disengaged flights.

The present invention includes a structure for keeping the crackers of the slug at the open end of the fork from falling over and contained within the moving fork of the cross conveyor after the moving fork has disengaged the slug from the moving flight of the first conveyor. The preferred method for containing the crackers at the open end of the moving fork may include forced low pressure, low volume gas or a tilting of the entire assembly to use the force of gravity. The gas is dispensed through a series of suitably positioned nozzles at the exposed face of the slug thereby having the gas stream gently push the front cracker back against the other crackers in the fork. The nozzles, which could be as simple as small-bore tubing, would best be arrayed one after another horizontally along the path of the open end of the fork with the gas stream from adjoining nozzles overlapping from side to side. Fewer round nozzles are necessary for containing crackers when some of the nozzles do not blow perpendicular to the face of the open crackers but, while still in a horizontal plane, do blow at an angle. Although a multiple of round orifice nozzles are preferred in the present invention, fewer or even just one horizontally slotted nozzle could alternatively be used. The preferred gas for blowing through the nozzles is air, but could be any suitable gas. Other means for containing products in the forks at the open end if a gas stream is objectionable for a particular product can include a series of long wires of metal or plastic with spring like properties arrayed in approximately a horizontally plane, anchored at one end, that would brush against the passing slug or product with a light force thereby holding the slug within the fork. Another means for containing different difficult products and/or slugs at the open end of the moving fork employs a small gate mechanism attached to the open end of one of the tines of the fork where said gate would be open during entry of the slug or product into the fork and then said gate would be closed when the three sides of the fork are in control of the product.

After passing the area or zone of intersection of the two conveyors, the transporter continues traveling in the direction of the cross conveyor with the cam of the cross conveyor maintaining the fork in the full rotation position. The fork, independently of and now remote from the first conveyor, contains the slug on three sides while the air streams of the multiple nozzles contains the fourth side of the slug in the same traveling fork. Continuing travel of the transporter results in the cam of the cross conveyor affecting the gradual rotation of the fork that contains the slug away from the full rotation position to the in-line rotation position wherein the fork and the contained slug are then in line with the direction of travel of the cross conveyor.

When the fork, with its contained slug, is in line with the direction of travel of the cross conveyor, the preferred means for containing the crackers at the open end of the moving fork changes from using low flow, low pressure gas to using a gate that is integral with a member of the transporter. The gate, which is essentially either a small piece of sheet metal or a short wire, is positioned as a fixed part of the transporter immediately in front of the cracker that is at the open end of the fork when the fork is in the in line position with the cross conveyor.

When the fork with its contained slug, is in line with the direction of travel of the cross conveyor, then the slug is consequentially in line end-to-end with the preceding slug. The pitch of the in line slugs in the cross conveyor is the same as the pitch of the forks and the fork controlling transporter of the cross conveyor. The pitch of the fork and slug of the cross conveyor is mechanically predetermined to match the mechanical pitch of the in-feed section of a slug wrapping machine that adjoins and receives the slugs that exit the cross conveyor of the present invention. A smooth transition of the slugs out of the cross conveyor into the pins of the in-feed section of the wrapping machine is facilitated by having the slug conveyance mechanism of the cross conveyor forks in the present invention located above the slug travel path whereas manufacturers of in-feed conveyor sections of the wrapping machines have the mechanism that transports the pins that contain the slugs located below the path of travel of the slugs. A slot in the exit end of the dead plate table of the cross conveyor enables the synchronized transfer of slug transport from the forks acting on the upper portion of the slug to the pins acting on the lower portion of the slug. The pins rise up through the slot in the dead plate table from below to simultaneously contain the slug with the forks. In the preferred embodiment of the present invention, the forks then lift upward and clear of the slug so that the pins of the in-feed conveyor take over independent containment and transport of the slug.

A significant aspect of the present invention is the geometric relationship between the first conveyor and the cross conveyor. In the preferred embodiment, the speed of the forked transporters in the cross conveyor in the first direction is set equal to the speed of the product in the first conveyor in the first direction. The speed of the first conveyor is equal to the number of products moved per minute multiplied by the distance between adjacent centerlines (pitch) of the products. Additionally, the speed of the cross conveyor is equal to the number of products moved per minute multiplied by the pitch distance of the products thereon. The ratio of the speed of the first conveyor in the first direction to the speed of the cross conveyor in the second direction is equal to the arccosine of the angle alpha where the angle alpha is the acute angle between the line of action of the first conveyor and the line of action of the cross conveyor.

DETAILED DESCRIPTION

For the purposes of providing and understanding the principles of the present invention, reference will now be made to the embodiment illustrated in the drawings and specification language used to describe the same. Nevertheless, by those skilled in the art, it will be understood that no limitation of the scope of the present invention is thereby intended, and further changes in the illustrated device may be made without deviating from the scope of the present invention.

Figure 1:
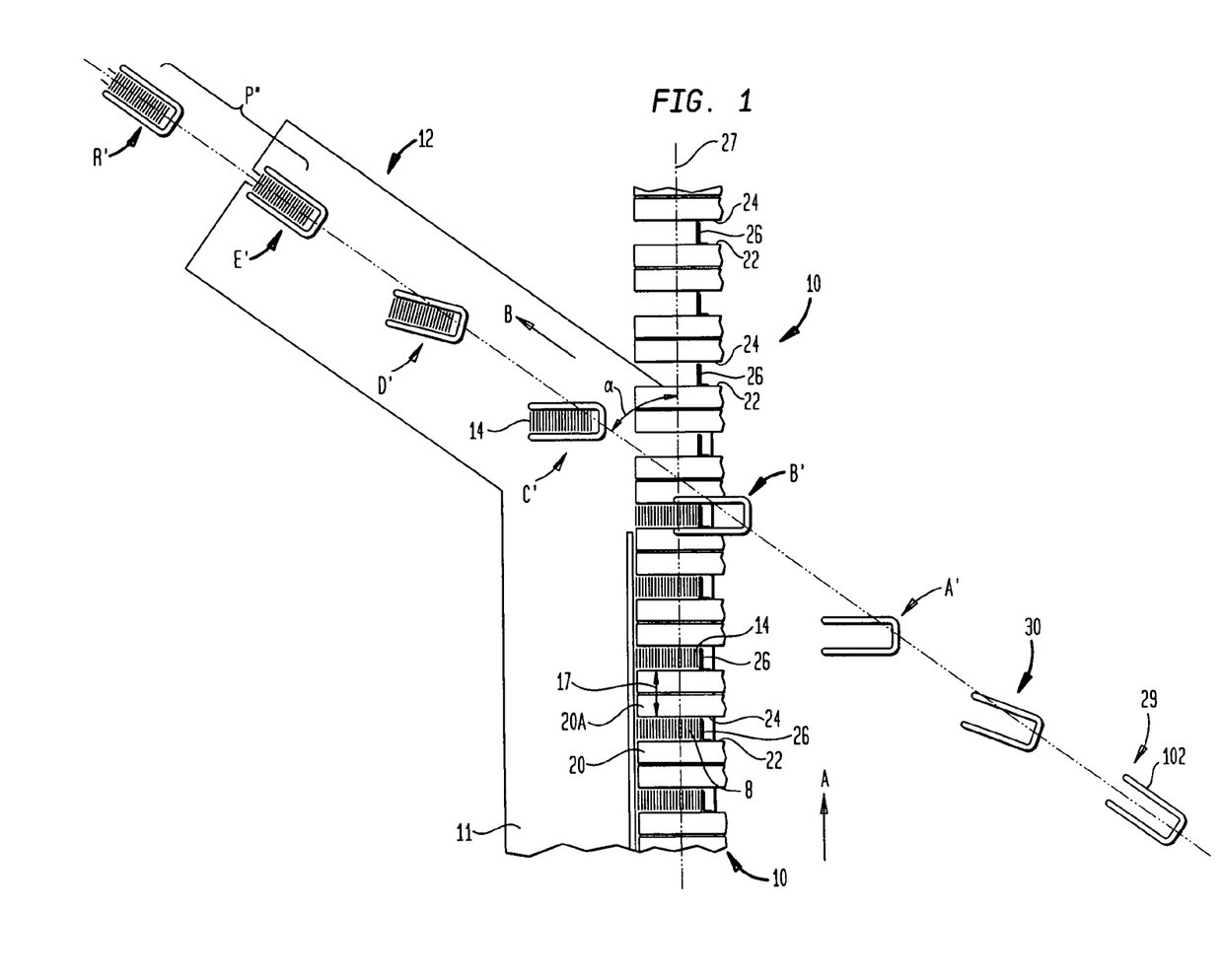
FIG. 1 is a top plan view schematically illustrating the transfer system of the present invention.

As shown in FIG. 1, the present invention is designed to transfer product, for instance slugs 14, moving in an X-direction, as indicated by arrow A, along a first conveyor 10 to a cross conveyor 12 moving in a θ-direction indicated by arrow B. The θ-direction consists of an X-coordinate and a Y-coordinate. Although the present invention may be adapted for numerous different products, one preferred embodiment of the present invention relates to transferring baked goods specifically crackers and cookies, known in the baking art as slugs 14, from first conveyor 10 to cross conveyor 12. Preferably, cross conveyor 12 is located vertically above conveyor 10. In one aspect of the present invention, the slugs 14 have a longitudinal axis L' that is perpendicular to the X-direction when the slugs are moving along the first conveyor 10.

As shown in FIG. 1, slugs 14 are pushed along first conveyor 10 by conveyor flights 20. First conveyor 10 preferably includes dead plate table 11 on which slugs 14 are deposited after transfer from a known automated dispensing machine, not shown in the figure. Preferably slugs 14 are located between two adjacent flights 20 and 20*a* and are deposited onto table 11. Flights 20 and/or 20*a* may include a front edge 22 and second edge 24. Thus, the slugs 14 are positioned between a first edge 22 of one flight 20 and a second edge 24 of flight 20*a*. By being positioned between two adjacent flights, it is possible to maintain the relative orientation of slug 14. This is highly relevant when slugs 14 consist of a plurality of individual elements such as crackers and cookies. At least one of the edges 22 or 24 may include a tab 26 for helping to maintain slug 14 in a vertical as well as a horizontal position, i.e. to prevent the crackers from falling over at one of the short ends of the slug.

The first conveyor may also include at least one support rail 28. Rail 28 is preferably located adjacent to flights 20, 20*a* and on an opposite side of the plurality of flights 20 as compared to tab 26. In one embodiment, rail 28 may be positioned at a different vertical level as compared to flights 20, 20*a* so that the flights may pass under or over the rail without any interference. Alternatively, the rail 28 may be positioned at the same height as the flights 20, 20*a*, except that the length of the flights is limited so that they can not reach the rail. Rail 28 also aids in maintaining the positioning of the slugs relative to table 11, as the slugs translate down first conveyor 10. As previously mentioned, flights 20 and 20*a*, rail 28 and tab 26 not only permit a product having a single element to translate along first conveyor 10 while maintaining a relative position, but also enable product consisting of multiple elements such as when the slugs include multiple crackers or cookies. The general concept of the present invention will now be explained with regard to FIG. 1. More specific details and features will be illustrated below and in the description of the figures to follow.

The first conveyor 10 has a longitudinal axis 27 extending in the X-direction. First conveyor 10 moves in the X-direction at a speed of S, with slugs 14 positioned having their longest length perpendicular to the directional movement of first conveyor 10. In a preferred embodiment, slugs 14 are separated by a constant distance, i.e., pitch, as illustrated by P' in the figure. P' is the distance between corresponding points of adjacent slugs on conveyor 10.

Slugs 14 travel along longitudinal axis 27 of first conveyor 10 until reaching a point where cross conveyor 12 intersects first conveyor 10. Rail 28 does not extend into the intersection zone so that slug 14 is unencumbered and able to be redirected into a different orientation and direction. As slugs 14 approach the intersection zone, a transporter 30, traveling along longitudinal axis 32 of cross conveyor 12 and preferably extending downwardly from the same, urges the slugs out from between adjacent flights 20 and 20*a*. In a preferred embodiment, transporter 30 includes fork 29 that has two tines 102, 103 and an open end 31. Transporter 30 is preferably attached to the cross conveyor 12 as will be described below.

Upon approaching first conveyor 10, transporter 30, or more specifically fork 29 is rotated to a rotational position with open end 31 facing the slugs on first conveyor 10 and fork 29 being positioned perpendicular to first conveyor 10 as denoted by position A' in FIG. 1. This position may be considered the full rotation position of the transporter. Since the fork 29 preferably only contacts an upper portion of slugs 14 and flights 20, 20*a* preferably only contact a lower portion, fork 29 can receive slug 14 in open end 31 as seen in the figure and denoted by position B' without interference. Slug 14 is urged in a direction that includes a direction, which is perpendicular to axis 27 and thus out from between adjacent flights 20, 20*a* and along longitudinal axis 32 by fork 29. It is important to note at this time, even during transition of slug 14 from first conveyor 10 to cross conveyor 12, the slug preferably maintains a constant rate of speed in the direction of travel of the first conveyor (i.e. the X-direction). Throughout this reference flights 20 and 20*a* may be referred as either one or the other without the need to differentiate. If required, the two will be distinguished.

Once the fork 29 and slug 14 have cleared first conveyor 10, specifically flights 20, 20*a*, the fork 29 begins to rotate to the θ-direction position with the tines parallel to longitudinal axis 32 of cross conveyor 12. Rotation of the fork 29 is shown in FIG. 1, as the fork moves from position C' to D' at positions denoted by C' and D'. As fork 29 rotates, slug 14 is also forced to rotate. Finally, as shown in the figures at position E', slug 14 is aligned with longitudinal axis 32 in a length-to-length (end-to-end) orientation. Slug 14 is now in correct alignment and can be received by an automated wrapping machine, not shown in the figure. Preferably, the cross conveyor transfers the product to a third conveyor which travels to or is part of a wrapping machine.

The acute angle between longitudinal axis 27 and 32 labeled α is less than 90 degrees, with the angle being a direct result of the relationship between P' and P'''. P''' is the distance between two corresponding points disposed on successive slugs 14 which are positioned on the cross conveyor. Although P' and P''' have been illustrated with reference to the distance between two particular points on slugs 14, alternate reference points on the conveyors may also be used. The speed of first conveyor may be designated as $F_1=(slugs/min) \times P'$. The speed of the cross conveyor may be designated as $Q_1=(slugs/min) \times P'''$. $Q_1$ has an X-component $Q_x$ and a Y-component $Q_y$. Setting $F_1=Q_x$, the angle between the two conveyors can be determined. Specifically, $\alpha = arccosine$ of $(F_1/Q_1)$.

FIG. 1 only depicts a basic schematic of a preferred embodiment of the present invention. Further details and specific features will become more clear as they are described and illustrated in the figures and specification to follow. A basic concept that can be realized by an analysis of FIG. 1 is that first conveyor 10 moves in the X-direction at a speed S. Cross conveyor 12 moves at a higher speed; however the cross conveyor has a component speed in the X-direction equal to the speed of first conveyor 10 in the X-direction. This enables the two conveyors to run in synchronization with slugs 14 being transferred from first conveyor 10 to cross conveyor 12 without any reduction in speed or without any instance when slugs 14, i.e., the product, are motionless.

Figure 4:
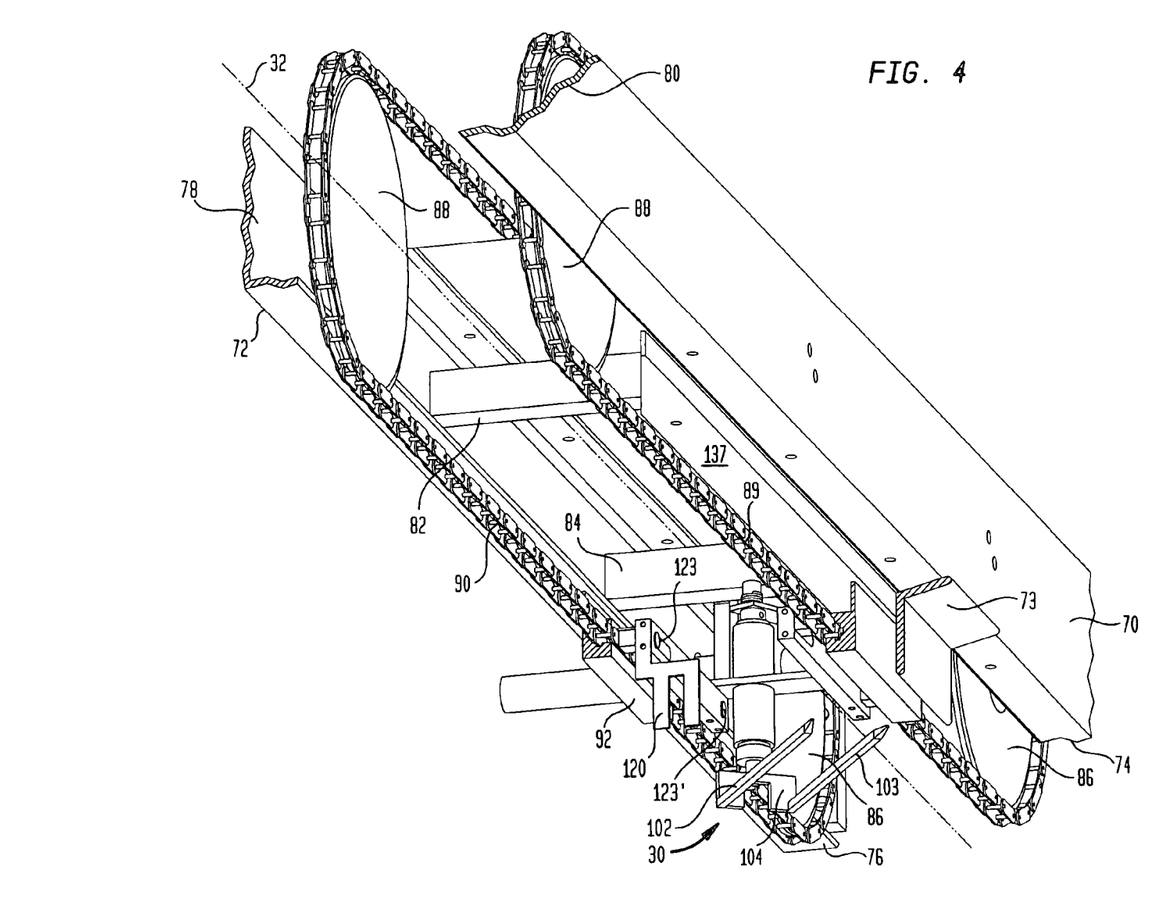
FIG. 4 is a bottom perspective view of an embodiment of the cross conveyor.
Figure 5:
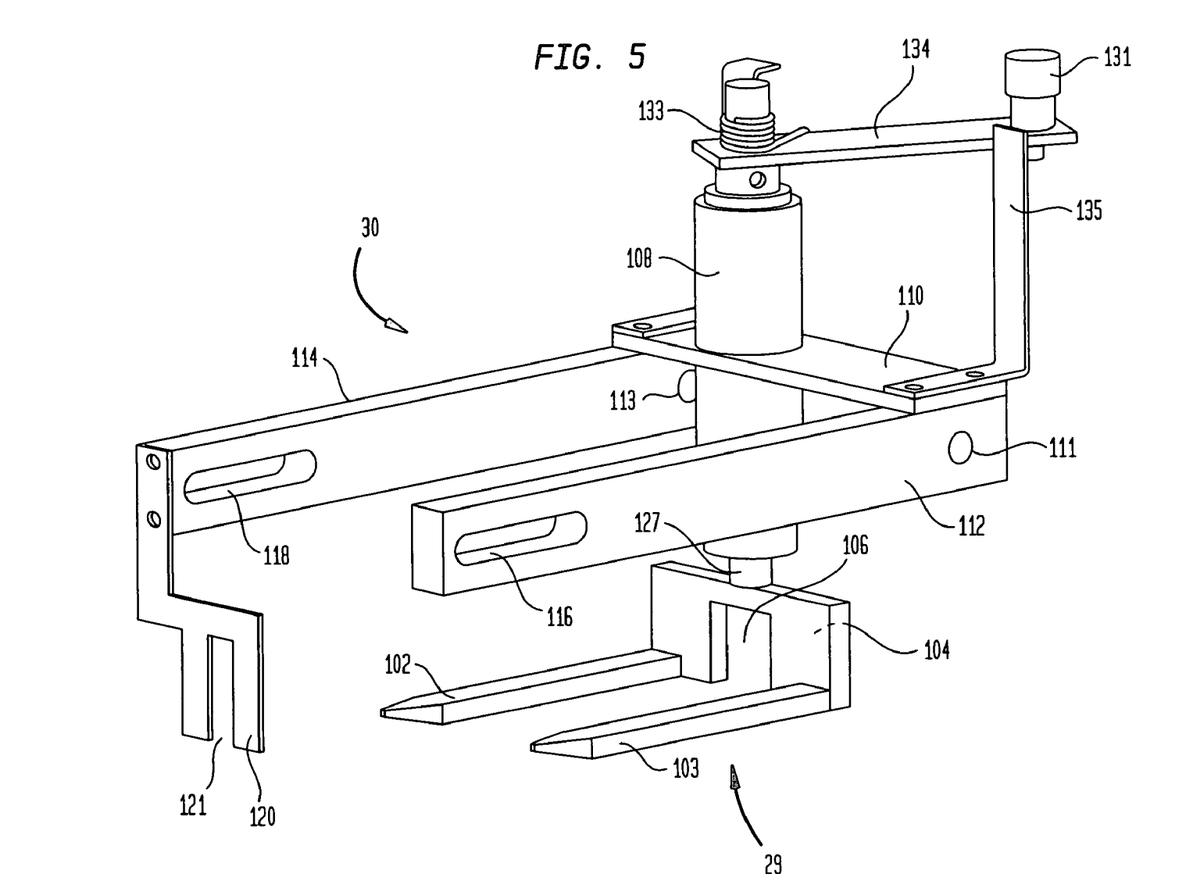
FIG. 5 is a perspective view of an embodiment of a slug transporter of the cross conveyor of FIG. 4.
Figure 6:
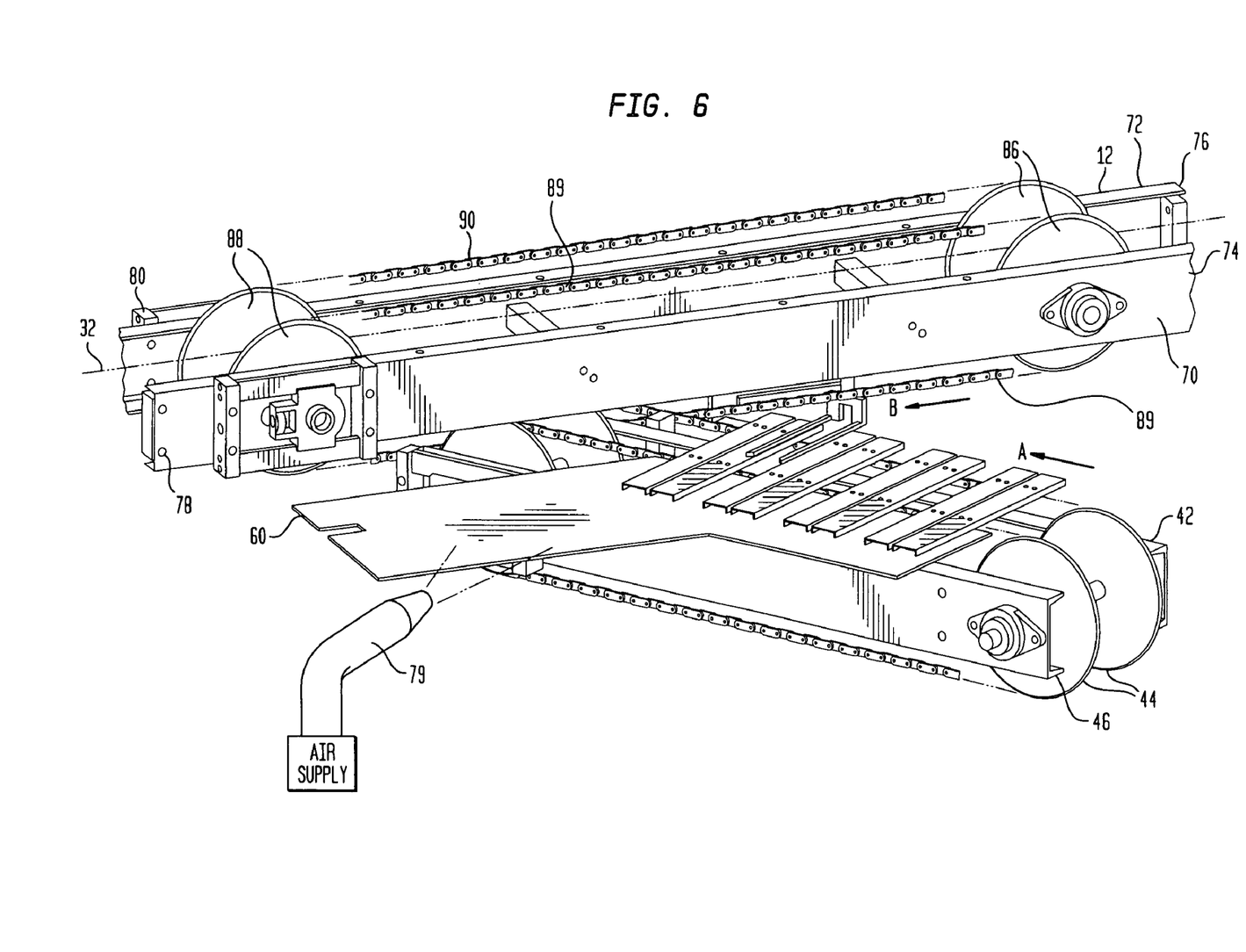
FIG. 6 is a perspective view of the first and cross conveyors of the present invention.

FIGS. 2-7 illustrate some of the more specific features used in the preferred embodiment to move slugs 14 from first conveyor 10 to cross conveyor 12. As shown in FIG. 6, in a preferred embodiment, cross conveyor 12 is positioned vertically above first conveyor 10. One skilled in the art could vary the design details to achieve the desired results of the present invention.

Figure 2:
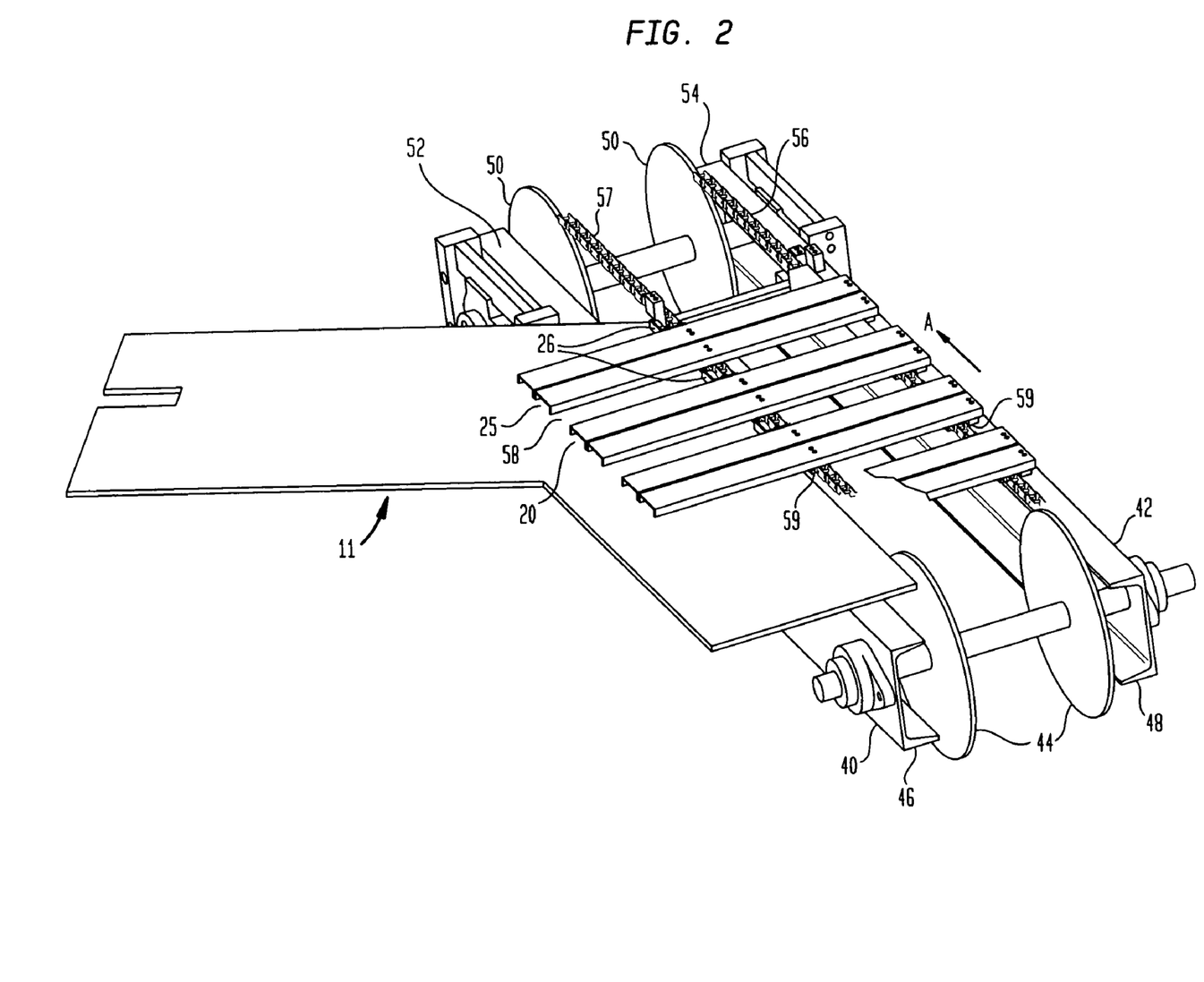
FIG. 2 is a top perspective view of an embodiment of the first conveyor.

With specific reference to FIGS. 2, 3, and 6, first conveyor 10 will be described. First conveyor 10 preferably includes left rail 40 and right rail 42. Left rail 40 and right rail 42 straddle conveyor 10 along the length thereof. Rails 40, 42 each have ends 46 and 48 as well as ends 52 and 54, respectively. Left rail 40 and right rail 42 may be separated from one another by a distance based on slug length and preferably are supported by perpendicular rails not shown in the figures. Preferably, the flight drive chains 56 and 57 as well as sprockets 44 are positioned adjacent rails 40, 42 and between proximal ends 46 and 48. A second set of sprockets 50 is disposed between distal ends 52 and 54 of left rail 40 and right rail 42, respectively, as well. Chains 56 and 57 engage sprockets 44 and 50 in any manner known in the art and rotate about the sprockets as the sprockets turn. Chains 56 and 57 rotate about the sprockets creating an endless loop to which flights 20 are connected, as illustrated in FIG. 6. Although the chains are not shown engaging the sprockets, in actuality they do employing methods known to those in the art. The first conveyor 10 can be of any length or be composed of a series of individual conveyors using a series of sprockets and one or more pairs of conveyor flight drive chains.

In a preferred embodiment, the flights 20 are attached to chain 56 at a point underlying end 21 of flight 20 while chain 57 underlies and is attached at a point closer to the center portion 23 of flight 20. In this configuration, proximal end 25 of flight 20 extends outwardly past chain 57 and away from chain 56. If so required, proximal end 25 may extend up to rail 28, which is not shown in FIG. 3.

The chains 56 and 57 are each housed in chain guides in a method of which is known to those in the art. For clarity of illustration, only a short portion of the chain guides are shown in relation to chain of the cross conveyor, as shown in FIG. 3, as will be described below. In actuality, the chain guides extend from sprockets 44 to sprockets 50. It should also be noted that chain guides support chains 56, 57 in horizontal planes below rails 40, 42 as well as above.

Chains 56 and 57 drive the plurality of flights 20 in a continuous revolution along left rail 40 and right rail 42 about sprockets 44 and 50. Flights 20 are preferably equally spaced at a distance relative to P' as described earlier, along chains 56 and 57, with flights 20, 20a at least partially defining voids 58 having a pitch P' between successive flights 20.

Underlying proximal end 25 of flights 20 is dead plate table 11. In a preferred embodiment, dead plate table 11 is stationary and may extend all the way to chain 57 and sprockets 44. Although not shown in the figures, drive sprockets 44 are preferably separated from the intersection zone between first conveyor 10 and cross conveyor 12 at a distance which permits a plurality of slugs 14 to be simultaneously placed onto dead plate table 11. Voids 58 are preferably defined by the first and second edges 22,24 of two flights 20, 20a, as shown in FIG. 1. The slugs may be deposited into the voids 20 and 20a as shown in FIG. 1 by a dispensing automated machine or by hand. Each individual slug 14 is preferably deposited into a single void 58. Dead plate table 11 enables slugs 14 to stay confined within voids 58 by providing a bottom support structure as slugs 14 slide in the X-direction along first conveyor 10.

Flights 20 preferably have a channel configuration and are oriented with the open end facing downward. However, any design known in the art could be used. Corners 61 of fights 20 are preferably rounded to prevent damage to slugs 14 as the slugs are lowered into voids 58 in a known manner. As shown in FIG. 2, dead plate table 11 preferably includes an angled portion so that when slugs 14 move from first conveyor 10 to cross conveyor 12, as will be described below, they are still supported by a bottom structure.

Cross conveyor 12 will now be described with reference drawn to accompanying FIGS. 3, 4, 5 and 6. In a preferred embodiment, cross conveyor 12 includes left rail 70 and right rail 72. Left rail 70 and right rail 72 have distal ends 74 and 76, respectively, and proximal ends 78 and 80, respectively, as well. Left rail 70 and right rail 72 are separated by a distance and are preferably attached to one another by a plurality of perpendicular rails such as rails 82 and 84 as shown in the drawings. Longitudinal axis 32 extends in the "B" direction along the length of cross conveyor 12 from its distal end to its proximal end.

Cross conveyor 12 further includes a first set of sprockets 86 and a second set of sprockets 88 disposed between left rail 70 and right rail 72. Sprockets 86 and 88 engage chains 89 and 90 much in the same way sprockets 44 and 50 engage chains 56 and 57. Similar to the relationship between first conveyor 10 and chains 56 and 57, chains 89 and 90 create an endless loop moving transporters 30 around the conveyor as the chains rotate about sprockets 86 and 88 in a direction designated by the arrow B.

Figure 3:
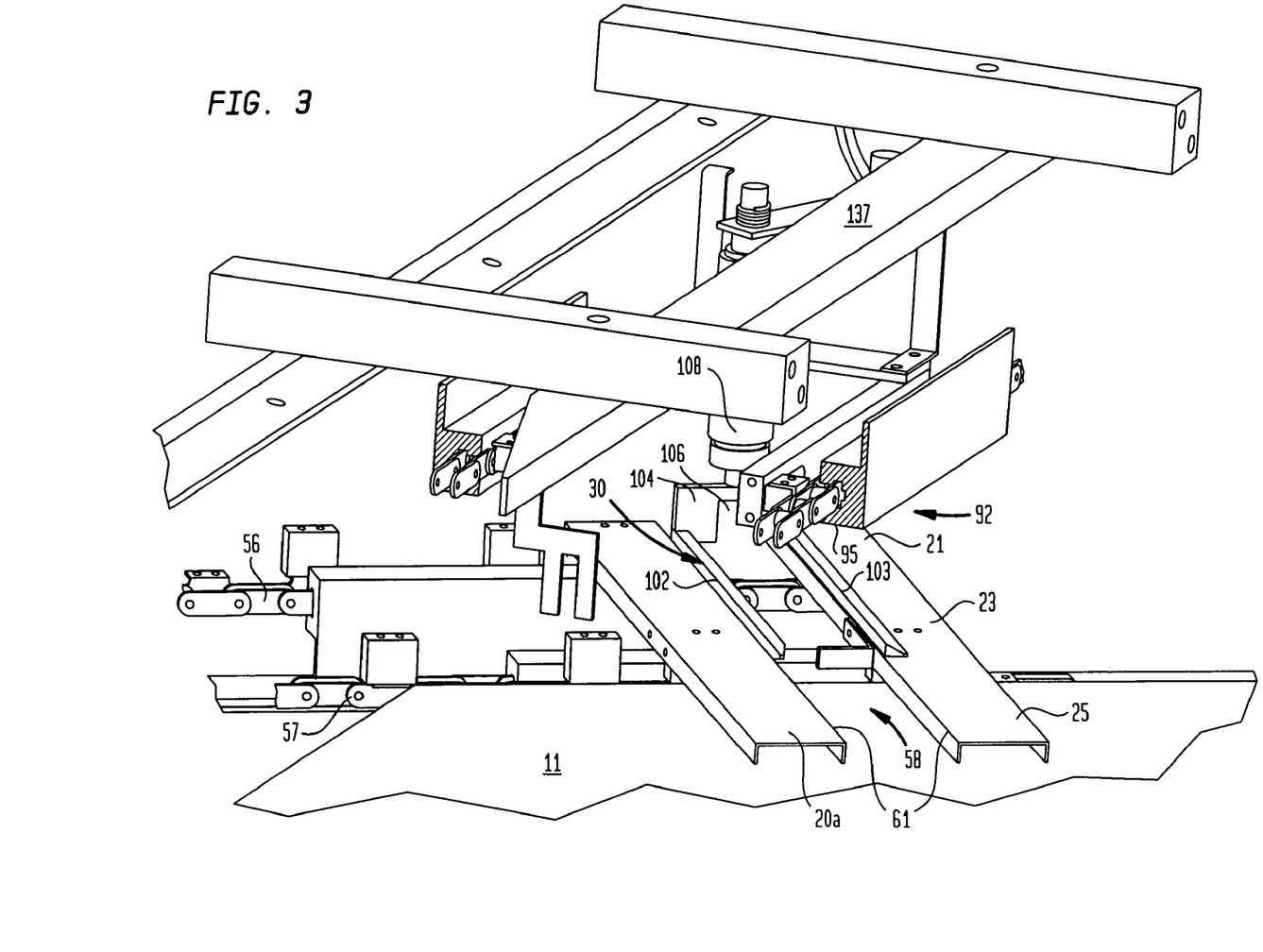
FIG. 3 is an enlarged perspective view of an intersection point between the first and cross conveyor.

In a preferred embodiment, as best seen in FIGS. 3 and 4, chains 89 and 90 are each housed in chain guides 92 which are coupled to each transporter 30. Only a portion of chain guides 92 is shown and the chain guides 92 support the chains 89 and 90 above and below the rails. Chain guides 92 are similarly constructed to chain guides used to support chains 56 and 57. The chain guides 92 are provided with an opening that enable access to the respective chains such that a mechanical coupling can be made to the chain 89, 90. Transporters 30 may be attached to chain 89 and 90 using common techniques known in the art. The chain guides 92 are supported by angle supports 73, as shown in FIG. 4. Only a portion of angle support 73 is shown for clarity of illustration but in actuality the angle support may extend substantially the entire length of chain guide 92.

As illustrated in FIGS. 3, 4 and 5, transporters 30 preferably include fork 29 which has two tines 102, 103 extending outwardly from rear wall 104. Rear wall 104 may include notch 106 disposed along a bottom surface of rear wall 104. Each transporter 30 also preferably include first bar 112 and second bar 114. The two bars 112, 114 are connected together by cross bar 110 at their respective distal ends. Further, a bracket 120 is attached to the proximal end of second bar 114. Cross bar 110 is also attached to a bearing housing 108.

First bar 112 and second bar 114, each include a slot 116, 118 adjacent their respective proximal ends, as well as pivot holes 111 and 113 adjacent their respective distal ends. As best shown in FIG. 4, in order to couple transporter 30 to chains 89, 90 leading pins 123 extending inwardly from the chains are received within slots 116, 118 and trailing pins 123' also extending inwardly from the chains are received within pivot holes 111, 113 respectively. Therefore, two separate pins are attached to each bar 112, 114 of the transporter 30. Preferably the leading pins 123 are concentric with one another when they are positioned in the slots 116, 118. Similarly, the trailing pins 123' are also concentric with one another when they are positioned within pivot holes 111, 113. The pins 123, 123' enable the tines 102 and 103 of the fork 29 to remain parallel at a fixed elevation above table 11 during the horizontal travel of chains 89 and 90. The slots enable the first and second bars 112, 114 to travel about the sprockets 86, 88 when the chord length between the leading pins 123 and trailing pins 123' is less than the linear distance between the pins when the chains are horizontal. Preferably, the common center line of pivot holes 111, 113 are approximately coincidental with the centerline of the vertical pivot shaft 127, as will be described below. This structure facilitates rotation of transporter 30 about the endless loop created by chains 89 and 90.

In one aspect of the present invention, the rear wall 104 of fork 29 is attached to the distal end of a vertical pivot shaft 127, as best viewed in FIG. 5. The proximal end of the shaft 127 is attached to a distal end of a cam arm 134. The cam arm 134 may be part of the pivot shaft 127 and is attached at its proximal end to cam follower 131, which is known to those in the art. The transporter 30 also preferably includes a cam arm stopper, such as stopper 135. The stopper 135 serves to limit the rotation of the pivot shaft 127 and subsequently the fork 29. A spring 133 may be provided to bias the pivot shaft 127 in one direction with regard to the stopper. As the workings of cams are known to those in the art, no further discussion is warranted except to say that the cam arm stopper and the pivot shaft 127 cooperate with one another so that the fork 29 is correctly positioned as required. And the components rotate the fork 29 between the position where the tines 102, 103 are perpendicular to the direction of movement of the first conveyor to a position where they are parallel to the direction of movement of the cross conveyor.

Although various mechanical means have been described above for facilitating movement with various elements of the present invention, other mechanical means may also be employed with or without hydraulic, pneumatic or electrical means that include servos and stepper motors as for example. These and additional mechanisms may be used to rotate the forks 29 while also translating the transporters 30 along the chains 89, 90.

Similar to the discussion regarding flights 20, only one transporter 30 is illustrated in the figures in order for ease of reference. In the preferred embodiment of the present invention, a plurality of transporters 30 are disposed and attached to chains 89 and 90. The number being dependent on the pitch of voids 58 and the speed of conveyors 10 and 12 as well as other factors. This enables the two conveyors to run at the same speed in at least the X-direction and a transporter 30 to receive a slug 14 from each void 58.

The method of operation will now be described with regard to FIGS. 1 and 6. Slugs 14 are deposited into voids 58 on conveyor 10 by either an automated delivery machine, another conveyor or by hand. The slugs are positioned so that individual slugs 14 are placed or received in voids 58 between adjacent flights 20. Slugs 14 remain aligned and upright due to the support of adjacent flights, a bottom support such as dead plate table 11, rail 28 and tab 26, as shown in FIG. 1. As one or both of the sprockets 44, 50 are rotated by an external power source; they simultaneously cause chains 56 and 57 to revolve about the sprockets. This in turn causes the plurality of flights 20 to also travel in the X-direction along an axis parallel to longitudinal axis 27 of first conveyor 10 with the longer length of flights 20 being perpendicular to the direction of travel. As flights 20 move in the X-direction, slugs 14 disposed between flights 20, 20*a* are propelled forward with their longest length also being perpendicular to the direction of travel.

Slugs 14 are propelled in the X-direction by flights 20 until the slugs reach an intersection zone between first conveyor 10 and cross conveyor 12. As shown in the figures, cross conveyor 12 is preferably positioned above first conveyor 10. Cross conveyor 12 may be supported by framework positioned above or below the conveyor. Additional framework also not shown may be used to support first conveyor 10. As slugs 14 reach the intersection zone, a transporter 30, propelled by chains 89 and 90, has its forks 29 rotated by the cam discussed herein or alternative mechanical means so that tines 102, 103 are perpendicular to the X-direction thereby enabling the fork 29 to receive the slugs in open end 31. Preferably, transporter 30 is positioned above flight 20 and only contacts the upper half of the slugs 14. Also preferably, flights 20 have a height which is lower than the total height of the slugs 14. Thus, the flights only contact the lower portion of the slugs. This prevents contact between the transporter tines 102, 103 and flights 20 as well as aids any downstream transitions to a subsequent conveyors. Rail 28 comes to an end at or before the intersection zone which permits slugs 14 to be urged forward out from voids 58 by the transporters 30. Since, transporters 30 and flights 20 travel at the same rate of speed along the x-direction, slugs 14 never come to a stop; that is never decelerate to a zero velocity.

Transporters 30, specifically fork 29, while in a full rotation position, i.e. perpendicular to the X-direction urges slug 14 out from void 58 between adjacent flights 20, 20*a*. Once fork 29 has reached a position remote from first conveyor 10, flights 20 and rail 28, the cam components (including a wall which is followed) allows the fork to rotate fork 29 towards the O-direction. As this occurs, the leading end of slug 14 is placed adjacent bracket 120, as shown in FIG. 5, which supports the leading face of the slug to prevent, in the case of crackers, the leading crackers from falling over. As discussed below, air may be used to keep the crackers vertical prior to the rotation of fork 29 into the θdirection.

In one embodiment, a plurality of nozzles 79 may be disposed at the intersection zone of conveyors 10 and 12. The nozzles 79 are orientated facing open end 31 of transporter 30. Once the slugs have bypassed rail 28, the individual elements, i.e., crackers, may tend to become displaced from their vertical and horizontal positioning, i.e., fall over. As the transporter moves forward and rotates, a blast of low-pressure gas from nozzles 79 may apply the required pressure to maintain the crackers vertical. The nozzles may be connected to a compressor or any other pressurized gas source (not shown in the figures). Of course, nozzles 79 can be eliminated if not required. In an alternate embodiment, the entire assembly or some of the components thereof may be slanted backwards such that the individual elements of the slugs 14 tilt backwards towards endplate 104 of the fork 29, thereby using gravity to prevent the individual elements from falling over.

Although not shown in the figures, an alternative way of maintaining the crackers of the slugs would be to gently support the crackers using mechanical means. For instance, a plurality of flexible spring like wires may be provided at specific locations along the traveling path of the slugs so as to maintain the correct orientation of the elements comprising the slugs.

Figure 7:
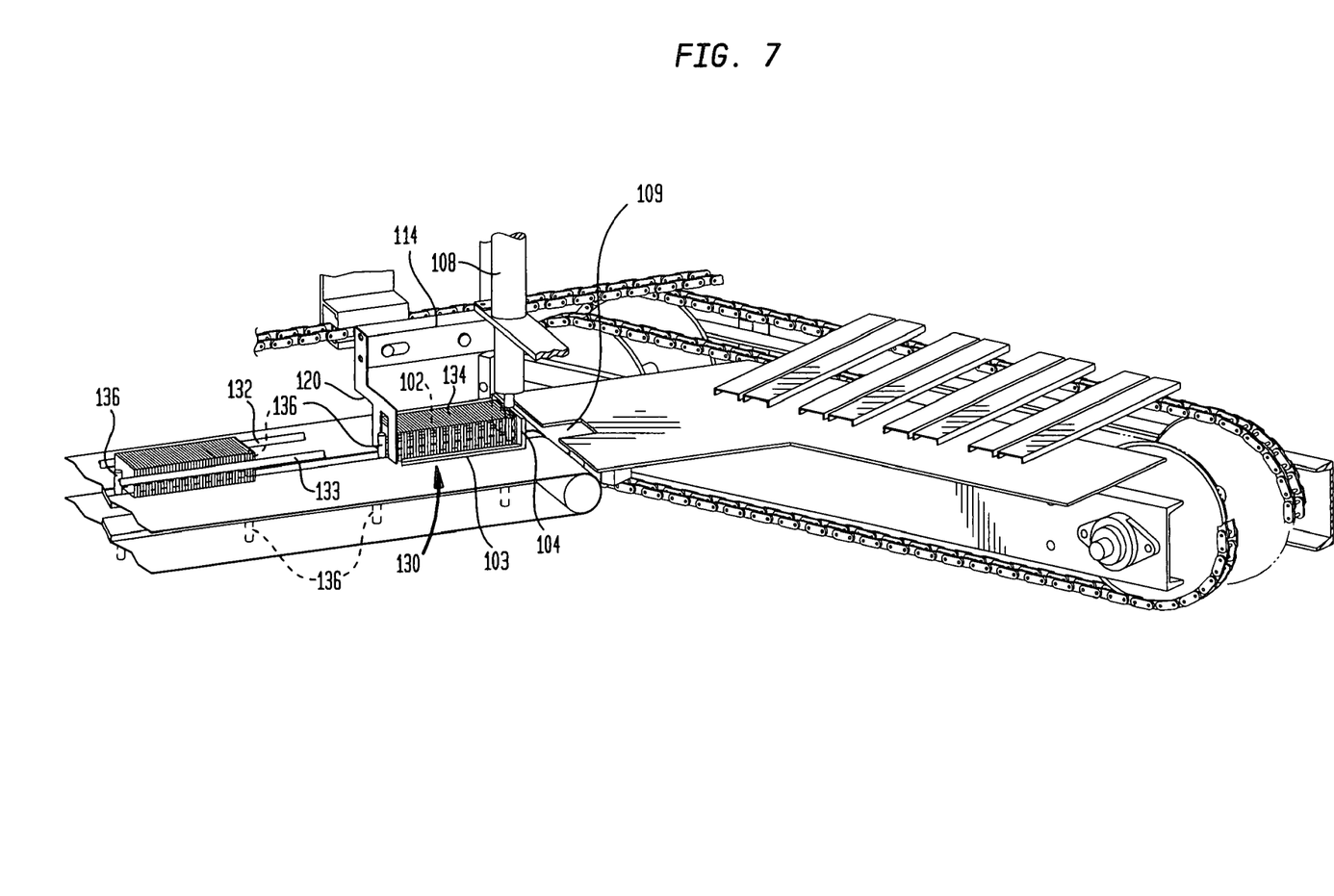
FIG. 7 is a perspective view illustrating downstream transfer of a product from the cross conveyor to a third conveyor.

As shown in FIG. 7, transporter 30 may propel slug 14 along dead plate 11 and preferably transfer the slug to a third conveyor 130 moving in line with the cross conveyor.

In a preferred embodiment, cross conveyor 12 also extends vertically above third conveyor 130 for a short length. Third conveyor 130 may include similar rails and sprockets as described in conjunction with first conveyor 10 and cross conveyor 12; however, the third conveyor also includes a system for maintaining the front and rear faces of the slug, vertical. This type of conveyor is similar to that used in the prior art and includes rails 132 extending along the length of the third conveyor. Supports 136 extend upwardly from a chain of the third conveyor and traverse through slot 109 as the support pin is proximate the cross conveyor 12. A support or pin borders the front and rear end of the slugs as they travel across the third conveyor.

The supports 136 are preferably located on third conveyor 130 at positions which correlate to the pitch of each transporter 30 and/or slug. More specifically, the supports 136 are positioned so that as the belts and chains of the third conveyor 130 rotate and the transporter 30 is translated above the third conveyor, one support 136 is synchronized to be aligned with notch 106, as seen in FIG. 5, on rear wall 104 of the transporter behind a slug and another support is positioned in front of the slug. Supports 136 are preferably in the form of pins 136. The pins 136 help to maintain the spatial relationship of a slug 14 transitioning from the fork 29 to the actual wrapping process. As the slug moves along the third conveyor to be wrapped, they are positioned between successive pins 136 and may be supported by rails 132 and 133 on opposite sides. Once the components of the third conveyor engage the slugs, the transporter 30 of the cross conveyor disengages with the slug and continues along the path of the endless loop of the cross conveyor. Thus, the slug is ready to be received by the wrapping machine. Although only pins at the front of the slug have been illustrated in the figures, a plurality of second pins and corresponding recesses in third conveyor 130 may be preferably positioned behind each slug 14 as well.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A product transfer system comprising:
    a first conveyor for conveying a series of product along a first axis;
    a cross conveyor oriented along a second axis, said first and second axis intersecting one another at a non 90° angle; and
    a plurality of rotatable transporters mounted on said cross conveyor for transferring said product from said first conveyor to said cross conveyor, wherein said transporters are initially oriented non-parallel to the second axis and generally perpendicular to said first axis before receiving said products and are rotatable into alignment with said second axis after receiving said product.

2. The product transfer system as set forth in claim 1, wherein said products have opposing ends and sides, said products on said first conveyor are in parallel side-to-side relationship and are in end-to-end relationship on said cross conveyor after said rotation of said receptacle.

3. The product transfer system as set forth in claim 2, wherein said transporters on said cross conveyor have a pair of forks for surrounding the sides of the product.

4. The product transfer system as set forth in claim 3, wherein said forked transporters rotate from a position generally perpendicular to said first direction to said second direction after receiving the product.

5. The product transfer system as set forth in claim 3, wherein a speed of said forked transporters on said cross conveyor in said first direction is equal to a speed of the product on said first conveyor in said first direction.

6. The product transfer system as set forth in claim 5, wherein said forked transporters on said cross conveyor rotate from a position generally perpendicular to said first direction to said second direction.

7. The product transfer system as set forth in claim 1, wherein the speed of the first conveyor is equal to the number of products moved per minute times the distance between adjacent centerlines (pitch) of the products and wherein the speed of the cross conveyor is equal to said number of products moved per minute times the longitudinal pitch distance of the products thereon.

8. The product transfer system as set forth in claim 7, wherein the arccosine of the ratio of the speed of said first conveyor in said first direction to said speed of cross conveyor in second direction is equal to the angle α.

9. The product transfer system as set forth in claim 1, wherein said cross conveyor further comprises a means for rotating the transporter from said first direction into said second direction.

10. The product transfer system as set forth in claim 1, further comprising an in-feed conveyor downstream of said cross conveyor.

11. The product transfer system as set forth in claim 10, wherein said cross conveyor is oriented in said second direction.

12. The product transfer system as set forth in claim 1, wherein said product is an unwrapped slug of cookies, crackers, or other baked goods.

13. The product transfer system as set forth in claim 12, further comprising a compressed gas source capable of acting on a leading end of said slug during rotation thereof from the first to the second direction.

14. The product transfer system as set forth in claim 1, wherein said cross conveyor is spaced vertically above said first conveyor.

15. The product transfer system according to claim 1, wherein each individual product includes multiple elements.

16. The product transfer system according to claim 15, further comprising a means for preventing said multiple elements of said individual product from falling forward during the transfer of said product from said first conveyor to said cross conveyor.

17. A method for transferring a series of products from a first conveyor to a cross conveyor comprising:
    moving said products in a first direction at a first velocity on a first conveyor;
    transferring said products to a cross conveyor vertically spaced from said first conveyor, said cross conveyor moving in a second direction at an angle rather than parallel or perpendicular with respect to said first direction; and
    adjusting the speed of the cross conveyor so the component of speed thereof in said first direction of said cross conveyor is equal to the speed of said first conveyor in said first direction wherein the step of transferring the product to said cross conveyor from said first conveyor includes rotating a transporter holding each of said products from a position generally perpendicular to the first direction to a position aligned with said second direction.

18. The method for transferring a series of products from a first conveyor to a cross conveyor as set forth in claim 17, further comprising securing said product in said transporter during rotation in order that the spatial relationship between said product and said transporter is maintained.

19. The method for transferring a series of products from a first conveyor to a cross conveyor as set forth in claim 18, further comprising containing sides of each of said product with tines located on said transporter.

20. The method for transferring products from a first conveyor to a cross conveyor as set forth in claim 17, further comprising orienting said products on said first conveyor in a side to side relationship and transferring said product to said cross conveyor by orientating said product in an end-to-end relationship.

21. The method of transferring a series of products from a first conveyor to a cross conveyor as set forth in claim 17, further comprising transferring said products from said cross conveyor to an in-feed conveyor.

22. The method of transferring a series of products from a first conveyor to a cross conveyor as set forth in claim 21, wherein said in-feed conveyor includes means for selectively engaging leading and trailing portions of said products as said products are transferred from said cross conveyor.

23. The method of transferring a series of products from a first conveyor to a cross conveyor as set forth in claim 21, wherein said products are crackers, cookies or other baked goods.

24. The method of transferring a series of products from a first conveyor to a cross conveyor as set forth in claim 23, wherein compressed gas is used to maintain said crackers or cookies vertical during said rotation.

25. A method of transferring a series of products from a first conveyor moving in a first direction to a second conveyor moving in a second direction comprising:
   orienting said first and second directions at an angle;
   setting the component of speed of the second conveyor in the first direction equal to the speed of the first conveyor; and
   capturing the product with a rotatable product capture element mounted on said second conveyor initially oriented in a direction perpendicular to said first direction of said first conveyor to capture the product and thereafter rotatable with said product to said second direction.

26. A method of transferring a series of products from a first conveyor moving in a first direction to a second conveyor moving in a second direction as set forth in claim 25, wherein the speed of the first conveyor is equal to the number of products moved per minute times the distance between adjacent centerlines (pitch) of the products and wherein the speed of the cross conveyor is equal to said number of products moved per minute times the pitch distance of the products thereon.

27. A method of transferring a series of products from a first conveyor moving in a first direction to a second conveyor moving in a second direction as set forth in claim 26, wherein the arccosine of the ratio of the speed of said first conveyor in said first direction to said speed of cross conveyor in a second direction is equal to the angle $\alpha$.

28. A product transfer system comprising:
   a first conveyor for conveying a series of product along a first axis;
   a cross conveyor oriented along a second axis, said first and second intersecting one another; and
   a plurality of rotatable transporters mounted on said cross conveyor for transferring said product from said first conveyor to said cross conveyor, wherein said transporter is initially oriented generally perpendicular to said first direction before receiving said products and is rotatable to said second direction after receiving said product, wherein said product is an unwrapped slug of cookies, crackers, or other individual elements further comprising a means for acting on a leading end of said slug during rotation thereof from the first to the second direction.

29. The product transfer system as set forth in claim 28 wherein the means is selected from the group consisting of compressed air and spring-like wires.

* * * * *

UNITED STATES PATENT AND TRADEMARK OFFICE
CERTIFICATE OF CORRECTION

| | |
|---|---|
| PATENT NO. | : 7,377,375 B2 |
| APPLICATION NO. | : 11/367851 |
| DATED | : May 27, 2008 |
| INVENTOR(S) | : Harold Feigel, Joseph Cardinali and Douglas Feigel |

It is certified that error appears in the above-identified patent and that said Letters Patent is hereby corrected as shown below:

Title Page; item (57); page 1, ABSTRACT, line 2, "series of product" should read --series of products--.
Column 3, line 21, "practice, all" should read --practice all--.
Column 3, line 26, "slugs, results" should read --slugs results--.
Column 5, line 29, "direction, is" should read --direction is--.
Column 6, line 40, "slug, clear" should read --slug clear--.
Column 7, line 24, "nozzles contains" should read --nozzles contain--.
Column 8, line 26, "cross conveyor" should read --cross conveyors--.
Column 9, line 55, "specifically fork 29 is" should read --specifically, fork 29, is--.
Column 9, line 64, "direction," should read --direction--.
Column 10, line 28, "of first" should read --of the first--.
Column 11, line 6, "employing" should read --employ--.
Column 11, line 20, "guides are" should read --guides is--.
Column 12, line 31, "preferably include" should read --preferably includes--.
Column 13, line 27, "being independent" should read --is dependent--.
Column 14, line 13, "allows" should read --allow--.
Column 14, line 20, "$\theta$direction" should read --$\theta$ direction--.
Column 15, line 5, "slug moves" should read --slug move--.
Column 15, line 29, "product along" should read --products along--.
Column 15, line 32, "second axis intersecting" should read --second axes intersecting--.
Column 16, line 3, "speed of cross" should read --speed of said cross--.
Column 16, line 4, "conveyor in second" should read --conveyor in said second--.
Column 18, line 10, "speed of cross" should read --speed of said cross--.
Column 18, line 13, "series of product" should read --series of products--.
Column 18, line 16, "second intersecting" should read --second axes intersecting--.

UNITED STATES PATENT AND TRADEMARK OFFICE
CERTIFICATE OF CORRECTION

PATENT NO. : 7,377,375 B2
APPLICATION NO. : 11/367851
DATED : May 27, 2008
INVENTOR(S) : Harold Feigel, Joseph Cardinali and Douglas Feigel It is certified that error appears in the above-identified patent and that said Letters Patent is hereby corrected as shown below:

Column 18, line 24, "elements further" should read --elements, further--.

Signed and Sealed this

Twenty-ninth Day of September, 2009

David J. Kappos
*Director of the United States Patent and Trademark Office*